United States Patent
Xue et al.

(10) Patent No.: US 11,825,515 B2
(45) Date of Patent: Nov. 21, 2023

(54) COORDINATION OF LISTEN BEFORE TALK STRUCTURE IN NEW RADIO-UNLICENSED MULTI-CHANNEL ACCESS

(71) Applicant: QUALCOMM Incorporated, San Diego, CA (US)

(72) Inventors: Yisheng Xue, San Diego, CA (US); Aleksandar Damnjanovic, Del Mar, CA (US); Xiaoxia Zhang, San Diego, CA (US); Jing Sun, San Diego, CA (US); Yongbin Wei, La Jolla, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 17/454,023

(22) Filed: Nov. 8, 2021

(65) Prior Publication Data
US 2022/0061086 A1    Feb. 24, 2022

Related U.S. Application Data

(63) Continuation of application No. 16/562,687, filed on Sep. 6, 2019, now Pat. No. 11,172,504.
(Continued)

(51) Int. Cl.
*H04W 74/00* (2009.01)
*H04L 5/00* (2006.01)
(Continued)

(52) U.S. Cl.
CPC ......... *H04W 74/008* (2013.01); *H04L 5/0032* (2013.01); *H04W 16/14* (2013.01); *H04W 72/0446* (2013.01); *H04W 72/27* (2023.01)

(58) Field of Classification Search
CPC ............... H04W 74/008; H04W 16/14; H04W 72/0446; H04W 72/27; H04W 48/16;
(Continued)

(56) References Cited

U.S. PATENT DOCUMENTS

| 11,172,504 B2 | 11/2021 | Xue et al. | |
| 2015/0223075 A1* | 8/2015 | Bashar | H04W 74/08 370/329 |

(Continued)

OTHER PUBLICATIONS

CATT: "Channel Access Procedures for NR Unlicensed Operations," 3GPP Draft; R1-1808395, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 20, 2018-Aug. 24, 2018, Aug. 11, 2018, XP051515777, 5 pages, Retrieved from the Internet: URL: http://www.3gpp.org/ftp/tsg%5Fran/WG1%5FRL1/TSGR1%5F94/Docs/R1%2D1808395%2Ezip [retrieved on Aug. 11, 2018] the whole document.
(Continued)

*Primary Examiner* — Mang Hang Yeung
(74) *Attorney, Agent, or Firm* — Norton Rose Fulbright US LLP

(57) ABSTRACT

Coordination of listen before talk (LBT) structure in new radio (NR) unlicensed (NR-U) multi-channel access operations is disclosed. In one aspect, when a base station determines to access shared communication spectrum, it may transmit an LBT structure signal that identifies the current LBT structure. The base station would then attempt access to the shared spectrum according to the LBT structure. In another aspect, a coordination server is used to manage access to the shared spectrum. Each node desiring access registers with the coordination server, which provides access parameters for the accessing node to use that increases the likelihood of successful access. The accessing
(Continued)

nodes will transmit the selected access configuration used to access the shared spectrum, wherein the access configuration is selected based on the access parameters.

20 Claims, 11 Drawing Sheets

Related U.S. Application Data

(60) Provisional application No. 62/737,586, filed on Sep. 27, 2018.

(51) Int. Cl.
*H04W 16/14* (2009.01)
*H04W 72/0446* (2023.01)
*H04W 72/27* (2023.01)

(58) Field of Classification Search
CPC .. H04W 74/0808; H04L 5/0032; H04L 5/001; H04L 27/2601; H04L 5/0091; H04L 5/0053; H04B 1/713
USPC .......................................................... 370/236
See application file for complete search history.

(56) References Cited

U.S. PATENT DOCUMENTS

| | | | |
|---|---|---|---|
| 2016/0345249 A1* | 11/2016 | Yoo | H04L 5/001 |
| 2016/0360420 A1* | 12/2016 | Liu | H04W 72/541 |
| 2017/0215171 A1* | 7/2017 | Sun | H04L 5/0091 |
| 2018/0070243 A1 | 3/2018 | Liu et al. | |
| 2018/0124777 A1 | 5/2018 | Yerramalli et al. | |
| 2020/0204327 A1* | 6/2020 | Jia | H04W 74/0808 |

OTHER PUBLICATIONS

International Search Report and Written Opinion—PCT/US2019/050237—ISA/EPO—dated Nov. 22, 2019.
Qualcomm Incorporated., "TxOP Frame Structure for NR unlicensed", 3GPP Draft, R1-1813410 7.2.2.2 Frame Structure for NR-U Operation, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018 Nov. 3, 2018 (Nov. 3, 2018), pp. 1-13, XP051479732, Retrieved from the Internet: URL:http://www.3gpp.org/ftp/tsg%5Fran/WG1%5FRL1/TSGR1%5F95/Docs/R1%2D1813410%2Ezip[retrieved on Nov. 3, 2018].

* cited by examiner

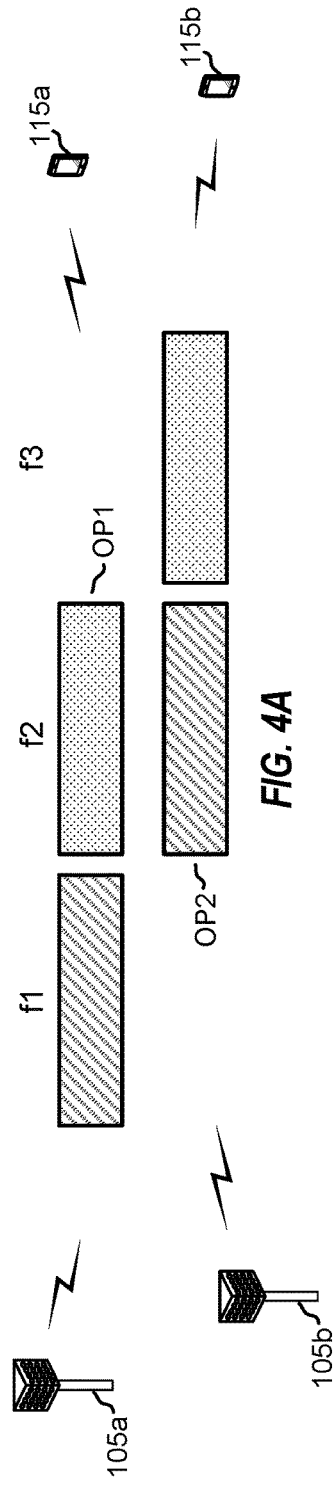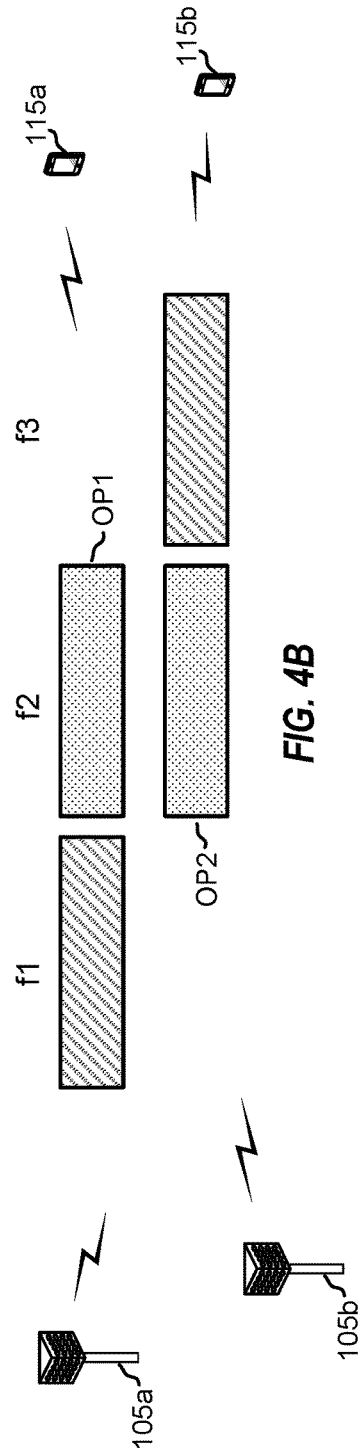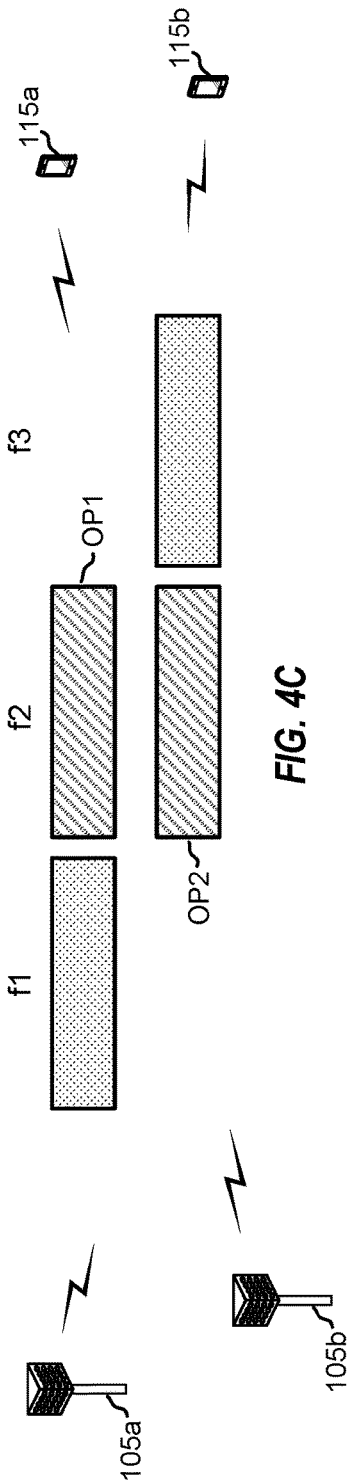

COORDINATION OF LISTEN BEFORE TALK STRUCTURE IN NEW RADIO-UNLICENSED MULTI-CHANNEL ACCESS

CROSS-REFERENCE TO RELATED APPLICATIONS

This application is a continuation of U.S. patent application Ser. No. 16/562,687, entitled, "COORDINATION OF LISTEN BEFORE TALK STRUCTURE IN NEW RADIO-UNLICENSED MULTI-CHANNEL ACCESS," filed Sep. 6, 2019 and claims the benefit of U.S. Provisional Patent Application No. 62/737,586, entitled, "COORDINATION OF LBT STRUCTURE IN NR-U MULTI-CHANNEL ACCESS," filed on Sep. 27, 2018, which is expressly incorporated by reference herein in its entirety.

BACKGROUND

Field

Aspects of the present disclosure relate generally to wireless communication systems, and more particularly, to coordination of listen before talk (LBT) structure in new radio (NR) unlicensed (NR-U) multi-channel access operations.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes determining, by a base station, to access a shared communication spectrum, transmitting, by the base station, a listen before talk (LBT) structure signal, wherein the LBT structure signal identifies a current LBT structure of the base station, and attempting, by the base station, to access the shared communication spectrum according to the current LBT structure.

In an additional aspect of the disclosure, a method of wireless communication includes determining, by a base station, to access a shared communication spectrum, transmitting, by the base station, a registration request with a coordination server managing access to the shared communication spectrum, receiving, by the base station, access parameters for the shared communication spectrum from the coordination server, selecting, by the base station, an access configuration for the shared communication channel based on the access parameters, and transmitting, by the base station, the access configuration to the coordination server.

In an additional aspect of the disclosure, a method of wireless communication includes receiving, at a coordination server, one or more registration requests from one or more base stations requesting to access a shared communication spectrum, wherein the coordination server manages access to the shared communication spectrum, determining, by the coordination server, access parameters that increase a likelihood of access to the shared communication spectrum by the one or more base stations, transmitting, by the coordination server, the access parameters to each of the one or more base stations, and receiving, by the coordination server, an access configuration from each of the one or more base station.

In an additional aspect of the disclosure, an apparatus configured for wireless communication includes means for determining, by a base station, to access a shared communication spectrum, means for transmitting, by the base station, a LBT structure signal, wherein the LBT structure signal identifies a current LBT structure of the base station, and means for attempting, by the base station, to access the shared communication spectrum according to the current LBT structure.

In an additional aspect of the disclosure, an apparatus configured for wireless communication includes means for determining, by a base station, to access a shared communication spectrum, means for transmitting, by the base station, a registration request with a coordination server managing access to the shared communication spectrum, means for receiving, by the base station, access parameters for the shared communication spectrum from the coordination server, means for selecting, by the base station, an access configuration for the shared communication channel based on the access parameters, and means for transmitting, by the base station, the access configuration to the coordination server.

In an additional aspect of the disclosure, an apparatus configured for wireless communication includes means for receiving, at a coordination server, one or more registration requests from one or more base stations requesting to access a shared communication spectrum, wherein the coordination server manages access to the shared communication spectrum, means for determining, by the coordination server, access parameters that increase a likelihood of access to the shared communication spectrum by the one or more base stations, means for transmitting, by the coordination server, the access parameters to each of the one or more base stations, and means for receiving, by the coordination server, an access configuration from each of the one or more base station.

In an additional aspect of the disclosure, a non-transitory computer-readable medium having program code recorded thereon. The program code further includes code to determine, by a base station, to access a shared communication spectrum, code to transmit, by the base station, a LBT structure signal, wherein the LBT structure signal identifies a current LBT structure of the base station, and code to attempt, by the base station, to access the shared communication spectrum according to the current LBT structure.

In an additional aspect of the disclosure, a non-transitory computer-readable medium having program code recorded thereon. The program code further includes code to determine, by a base station, to access a shared communication spectrum, code to transmit, by the base station, a registration request with a coordination server managing access to the shared communication spectrum, code to receive, by the base station, access parameters for the shared communication spectrum from the coordination server, code to select, by the base station, an access configuration for the shared communication channel based on the access parameters, and code to transmit, by the base station, the access configuration to the coordination server.

In an additional aspect of the disclosure, a non-transitory computer-readable medium having program code recorded thereon. The program code further includes code to receive, at a coordination server, one or more registration requests from one or more base stations requesting to access a shared communication spectrum, wherein the coordination server manages access to the shared communication spectrum, code to determine, by the coordination server, access parameters that increase a likelihood of access to the shared communication spectrum by the one or more base stations, code to transmit, by the coordination server, the access parameters to each of the one or more base stations, and code to receive, by the coordination server, an access configuration from each of the one or more base station.

In an additional aspect of the disclosure, an apparatus configured for wireless communication is disclosed. The apparatus includes at least one processor, and a memory coupled to the processor. The processor is configured to determine, by a base station, to access a shared communication spectrum, to transmit, by the base station, a LBT structure signal, wherein the LBT structure signal identifies a current LBT structure of the base station, and to attempt, by the base station, to access the shared communication spectrum according to the current LBT structure.

In an additional aspect of the disclosure, an apparatus configured for wireless communication is disclosed. The apparatus includes at least one processor, and a memory coupled to the processor. The processor is configured to determine, by a base station, to access a shared communication spectrum, to transmit, by the base station, a registration request with a coordination server managing access to the shared communication spectrum, to receive, by the base station, access parameters for the shared communication spectrum from the coordination server, to select, by the base station, an access configuration for the shared communication channel based on the access parameters, and to transmit, by the base station, the access configuration to the coordination server.

In an additional aspect of the disclosure, an apparatus configured for wireless communication is disclosed. The apparatus includes at least one processor, and a memory coupled to the processor. The processor is configured to receive, at a coordination server, one or more registration requests from one or more base stations requesting to access a shared communication spectrum, wherein the coordination server manages access to the shared communication spectrum, to determine, by the coordination server, access parameters that increase a likelihood of access to the shared communication spectrum by the one or more base stations, to transmit, by the coordination server, the access parameters to each of the one or more base stations, and to receive, by the coordination server, an access configuration from each of the one or more base station.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 4A-4E are block diagrams illustrating base stations and belonging to different operators and competing for communications using a shared spectrum.

DETAILED DESCRIPTION

Figure 1:
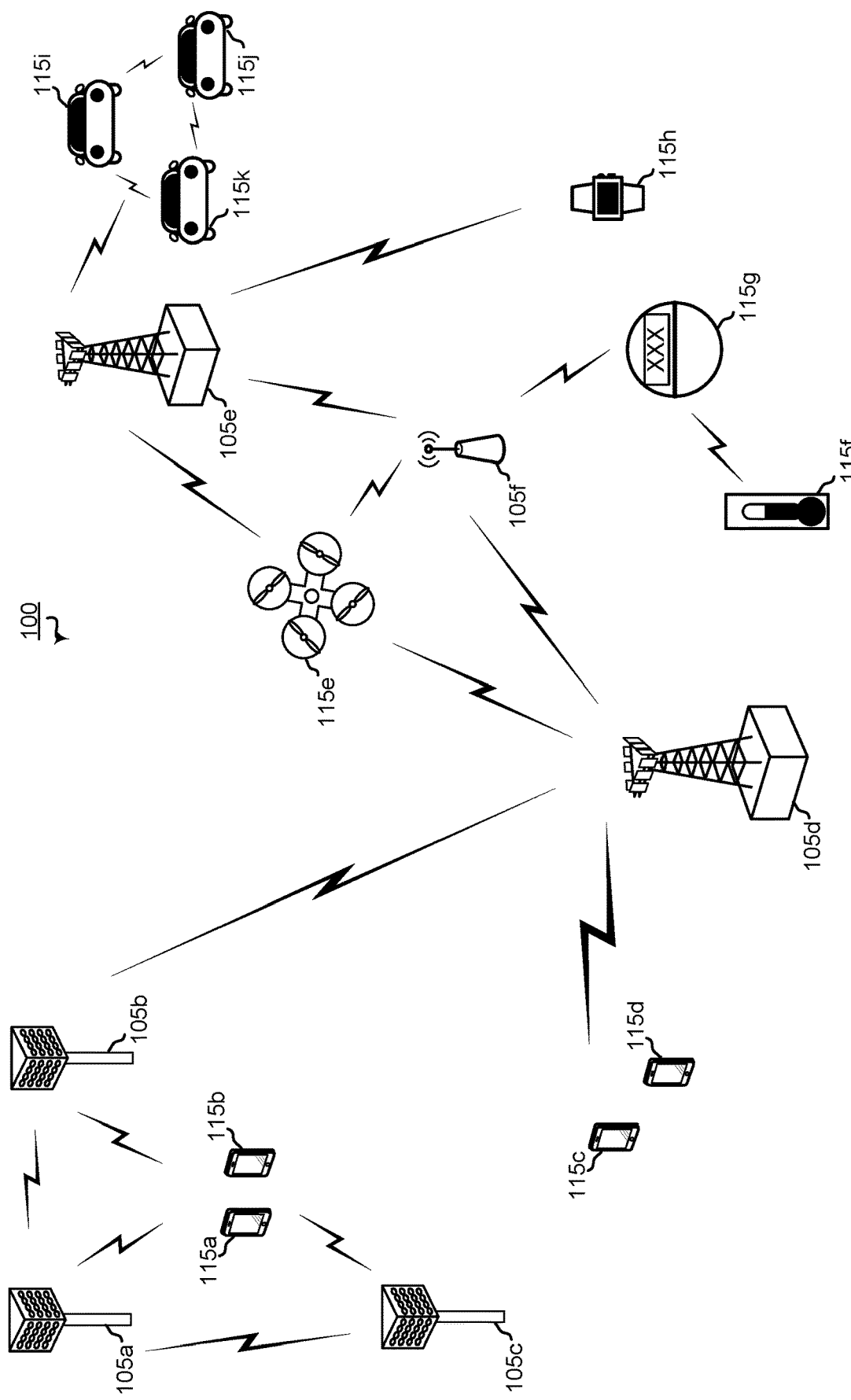
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
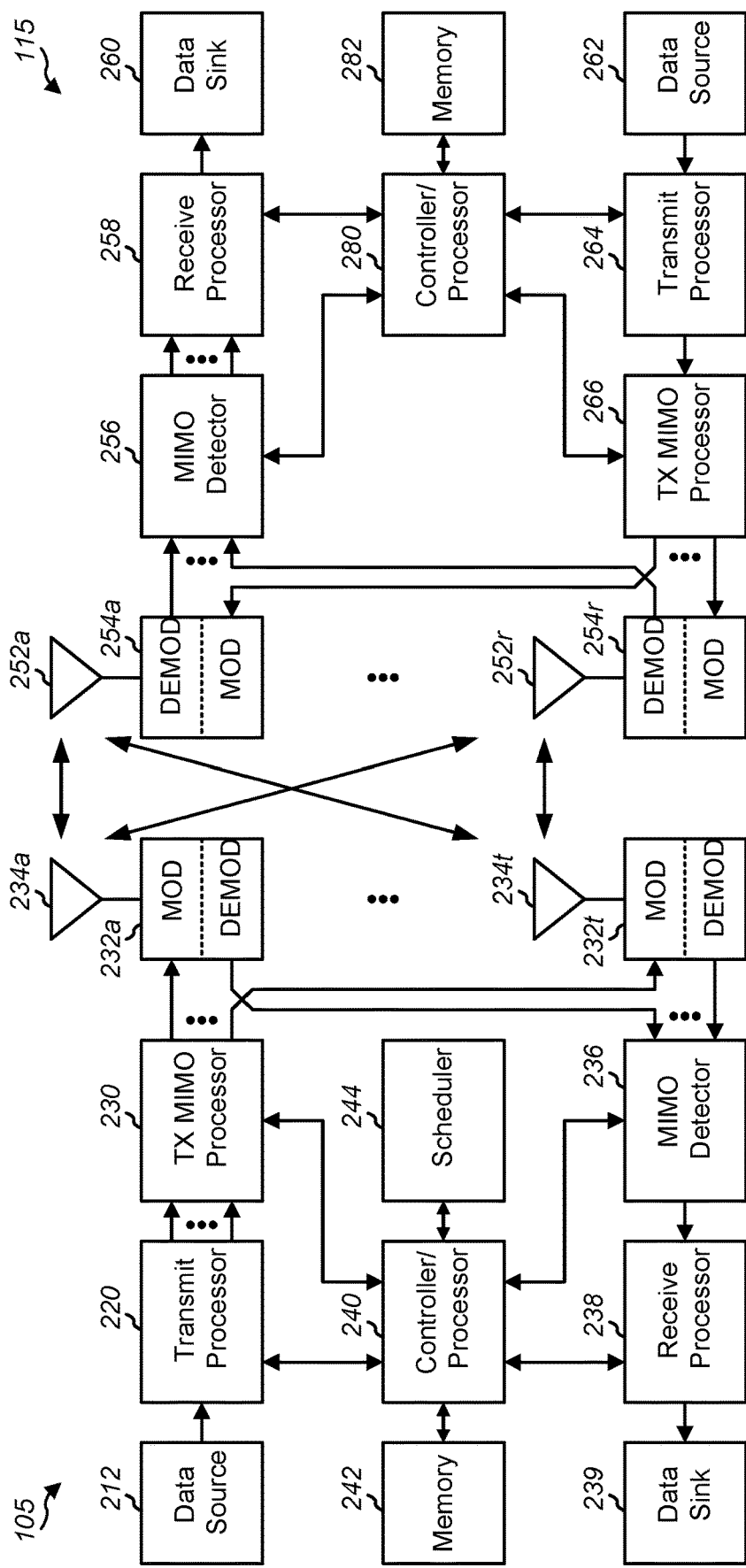
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 5, 7A, and 7B, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
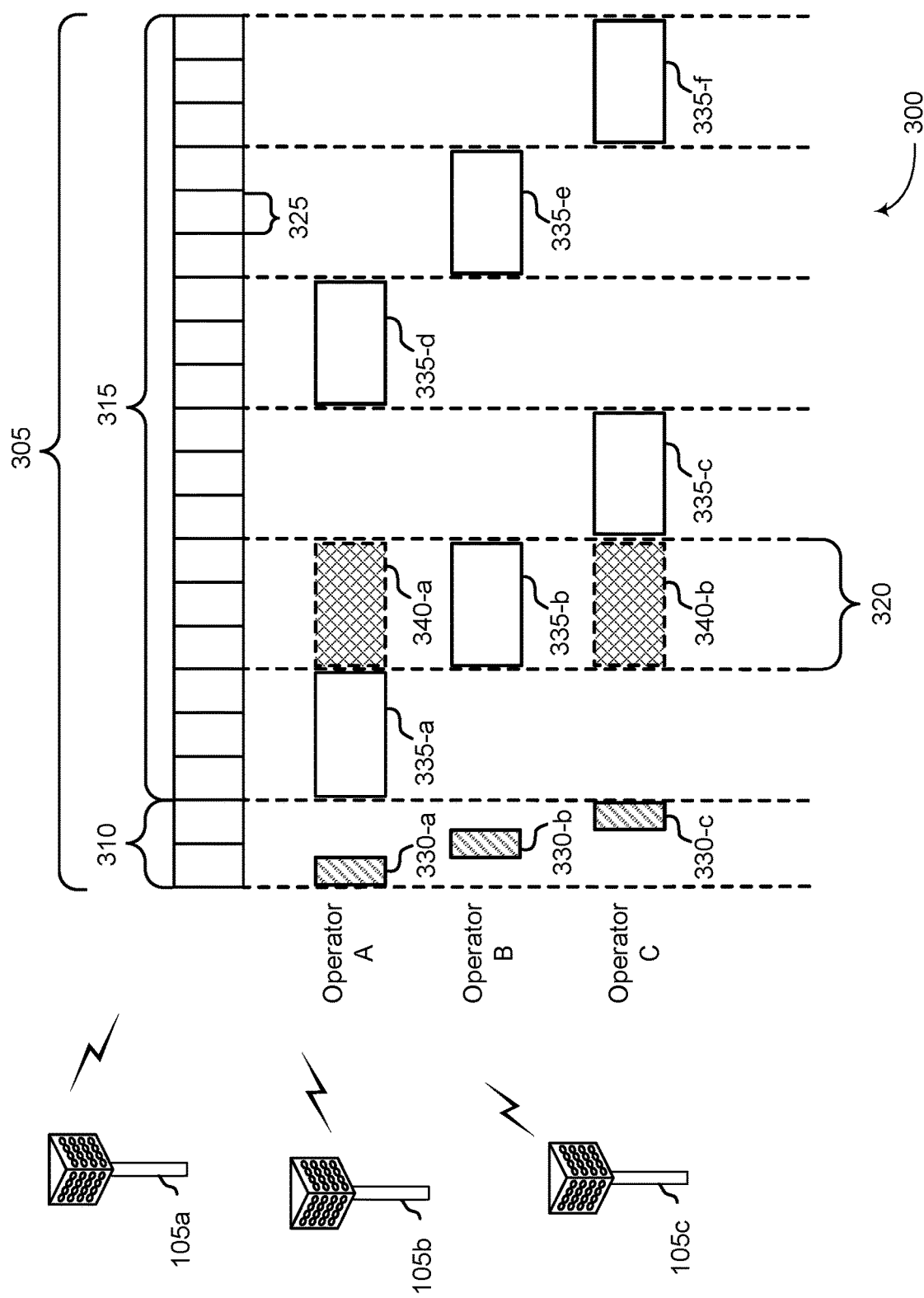
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B (e.g., G-INT-OpB), resources 335-c (e.g., G-INT-OpC) may be prioritized for Operator C, resources 335-d may be prioritized for Operator A, resources 335-e may be prioritized for Operator B, and resources 335-f may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT (e.g., resources 335-b), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-b (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of the superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

One of the features offered by 5G NR operations provides for more high-efficient utilization of wider bandwidths, as compared to LTE networks. The channel bandwidth for sub-7 GHz systems can be up to 100 MHz. Such are large channel bandwidth would likely penetrate into unlicensed/shared spectrum, NR-U. In order to peacefully coexist with WiFi and license assisted access (LAA) operations, whose basic bandwidth unit is 20 MHz, it can be envisioned that channel bandwidth may be structured considering a 20 MHz granularity in listen-before-talk (LBT). Thus, in such implementations, multiple subbands may be reserved for a particular transmission opportunity (TxOP) (e.g., 5 20 MHz subbands for a 100 MHz channel bandwidth).

Another reason for having a structured LBT configuration is the support of low-radio frequency (RF)-capable UEs. NR-U is envisioned to support a very wide range of applications. Some NR-U application may be bandwidth heavy and choose to operate with low-RF-capable UEs. The technical capabilities of low-RF-capable UEs may monitor only a portion of a wideband channel bandwidth, such as a bandwidth part (BWP). Such low-RF-capable UEs would benefit where the monitored BWP has a guaranteed, or at least a higher, LBT successful rate.

Figure 4D:
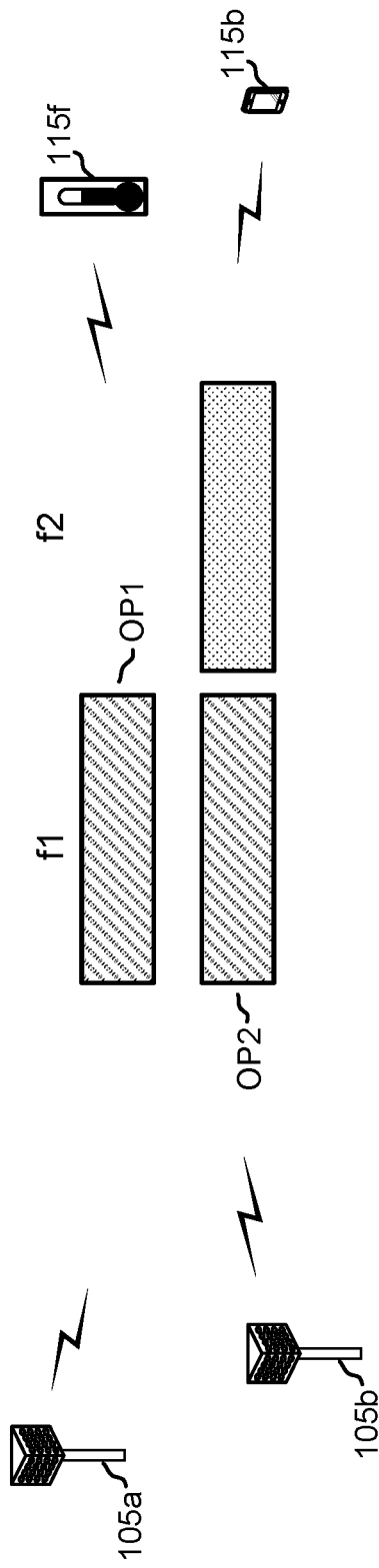

FIGS. 4A-4E are block diagrams illustrating base stations 105a and 105b and UEs 115a and 115b belonging to different operators and competing for communications using a shared spectrum. FIGS. 4A-4C provide multi-channel operations between different operators in which each network node pair, base station 105a-UE 115a and base station 105b-UE 115b, are configured with different LBT structure deployments of two 20 MHz channels over a 60 MHz bandwidth. FIG. 4A illustrates a 1-2-2-3 deployment, in which the Op 1 pair are configured with f1 as the primary channel (1) and f2 as the secondary channel (2), while the Op 2 pair are configured with f2 as the primary channel (1) and f3 as the secondary channel (3) (e.g., 1-2-2-3 deployment). FIG. 4B illustrates a 1-2-3-2 deployment, in which the Op 1 pair are configured with f1 as primary channel and f2 as secondary channel, with the Op 2 pair configured with f3 as primary channel and f2 as secondary channel. FIG. 4C illustrates a 2-1-2-3 deployment, in which the Op 1 pair are configured with f1 as secondary channel and f2 as primary channel, with the Op 2 pair configured with f2 as primary channel and f3 as secondary channel.

In operation of the deployments illustrated in each of FIGS. 4A-4C, performance varies greatly depending on the relative allocations of the primary channels. The worst performance overall occurs in the 2-1-2-3 deployment of FIG. 4C, as the nodes of Op 1 and Op 2 will always compete for access in their overlapping primary channel (f2). The best overall performance occurs in the 1-2-3-2 deployment of FIG. 4B, as each operator's primary channel does not overlap with any of the other operator's channels. The 1-2-2-3 deployment of FIG. 4A provides the best performance for Op 1, as Op 1's primary channel (f1) does not overlap, but Op 2's primary channel (f2) overlaps with Op 1's secondary channel (f2), which, because Op 1's primary channel may block Op 2's LBT on its primary channel (f2), tendency will be to favor the throughput of Op 1.

Figure 4E:
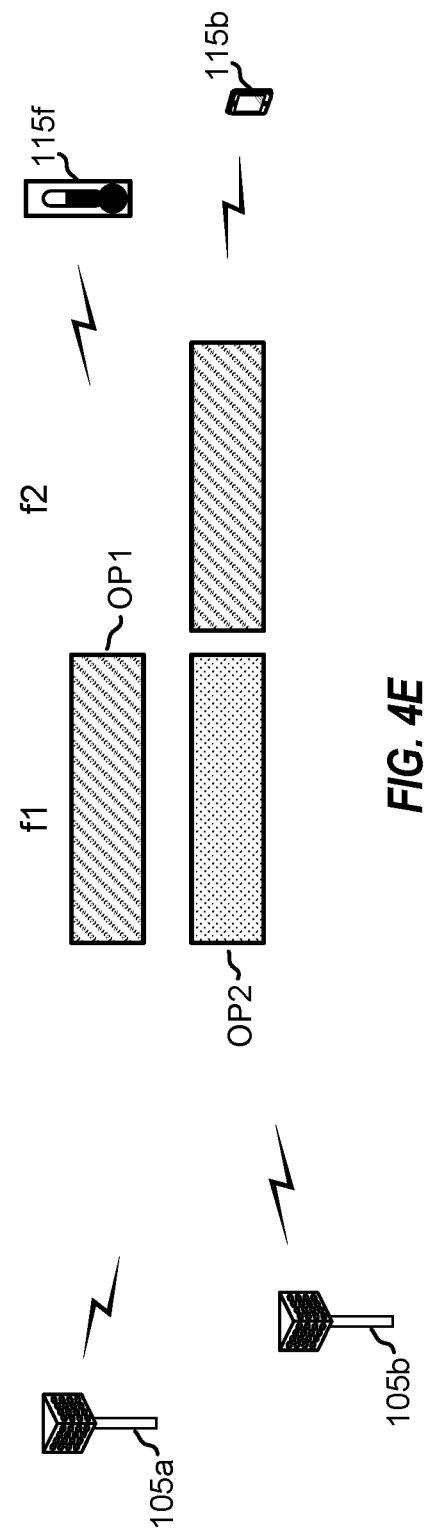

FIGS. 4D-4E provide competing communications considering an asymmetric operator (Op 1), which competes for access at a single 20 MHz primary channel at f1. The different deployments with the 40 MHz Op 2 provide either a co-primary configuration (1-m1-1-2), in which each of Op 1 and Op 2's primary channel overlaps at f1, or an interleaved primary configuration (1-m1-2-1), in which Op 2's primary channel is configured at f2. The co-primary configuration of FIG. 4D results in the worst performance overall with both operators competing for primary channel at f1. Op 1 would strongly favor no sharing of spectrum with Op 2 in the absence of any fairness mechanism.

The issue of coordination of multi-channel access has arisen also in development of LAA operations. However, it had generally been thought that because of the number of available channels in 5 GHz spectrum, there was no necessity of addressing coordinated access. This suggestion of plentiful available channels does not carry over to 5G operations considering 100 MHz channel bandwidths in NR and NR-U and 80 MHz channel bandwidth for 802.11ac/ax, which competes for spectrum at 5 GHz. More advanced inter-operator radio resource management (RRM) techniques may be useful for coexistence of 5G NR, NR-U, and 802.11ac/ax. Increasing spectrum into 6GHz may seem to add more bandwidth, but suggested operations into 6 GHz have discussed an even wider LBT granularity (e.g., >20 MHz). As such, assuming a "plenty of channels" approach may result in performance issues for long-term deployments. Leveraging the geolocation databases, which have been pursued in the IEEE 802.11 community, could provide flexibility for coordinating access between operators. Various aspects of the present disclosure provide for access coordination of shared spectrum between different operators.

Figure 5:
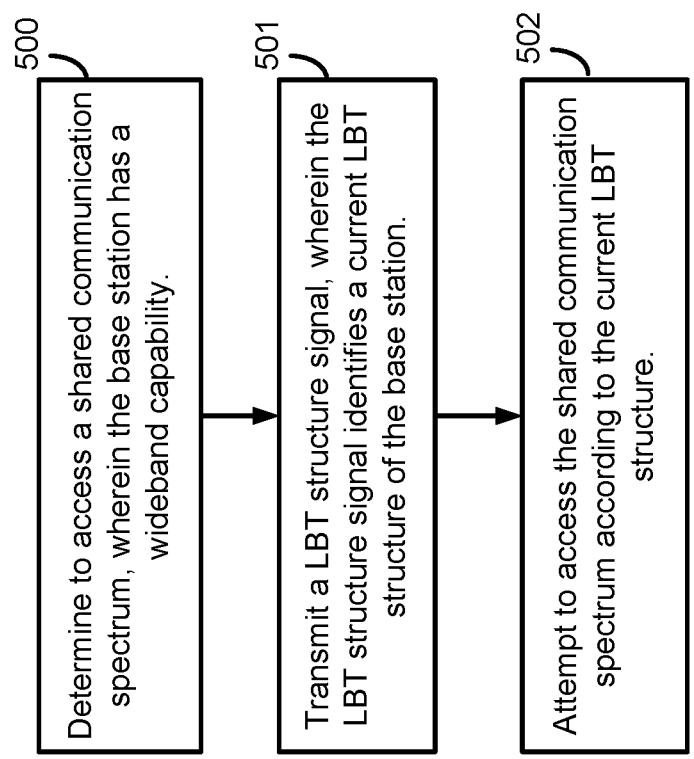
FIG. 5 is a block diagram illustrating example blocks executed to implement one aspect of the present disclosure.
Figure 9:
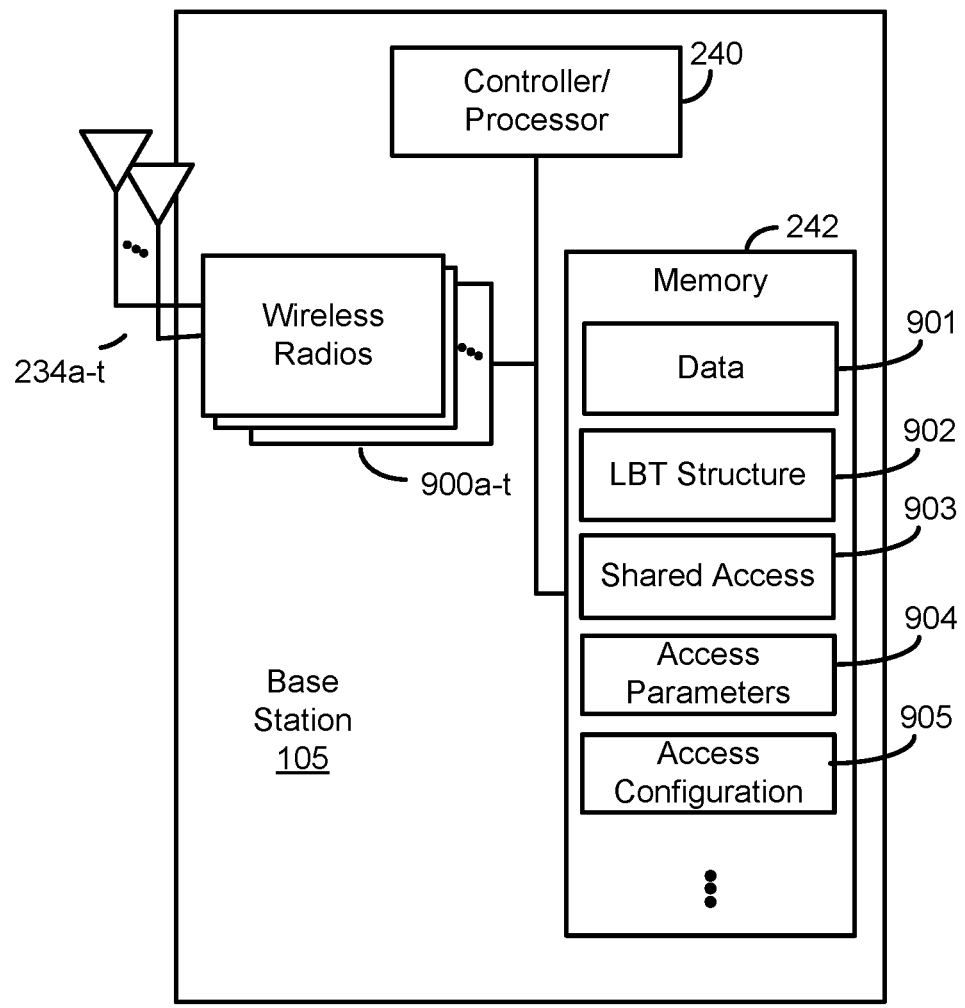
FIG. 9 is a block diagram illustrating a base station configured according to one aspect of the present disclosure.

FIG. 5 is a block diagram illustrating example blocks executed to implement one aspect of the present disclosure. The example blocks will also be described with respect to base station 105 as illustrated in FIG. 9. FIG. 9 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 900a-t and antennas 234a-t. Wireless radios 900a-t includes various components and hardware, as illustrated in FIG. 2 for base station 105, including modulator/demodulators 232a-t, MIMO detector 236, receive processor 238, transmit processor 220, and TX MIMO processor 230.

At block 500, a base station determines to access a shared communication spectrum, wherein the base station has a wideband capability. Coordination techniques according to the present disclosure arise when a base station (e.g., gNB, AP, etc. with CBW≥20 MHz) determines to attempt access to the shared spectrum for communications with a served UE. For example, a base station, such as base station 105 may determine it has downlink transmission for a served UE when data buffer 901, in memory 242, identifies data for transmission to the served UE. Alternatively, base station 105 may receive a scheduling request or notification of uplink communications from the served UE via antennas 234a-t and wireless radios 900a-t.

At block 501, the base station transmits an LBT structure signal, wherein the LBT structure signal identifies a current LBT structure of the base station. Each such base station, such as base station 105, would announce its current LBT structure via over the air (OTA) signaling. Base station 105, under control of controller/processor 240 accesses the current LBT structure at LBT structure 902, in memory 242, and transmit the current LBT structure via wireless radios 900a-t and antennas 234a-t. Such signaling can be embedded in a discovery reference signal (DRS) or embedded into a channel access preamble(s) that can be read by other neighboring base stations and non-associated/non-served UEs. The LBT structure signal further specifies the primary LBT channel to be targeted at a guaranteed or higher LBT success rate, and the secondary LBT channel(s), as well how the secondary LBT channels are to be occupied (e.g., any order, dependence, or the like).

At block 502, the base station attempts to access the shared communication spectrum according to the current LBT structure. Base station 105 attempts to access the shared spectrum via wireless radios 900a-t and antennas 234a-t, according to the current LBT structure at LBT structure 902 in memory 242. Neighboring base stations of different operators, having received and read the LBT structure of base station 105 may configure their own LBT structures to accommodate or complement the LBT structure of base station 105. Thus, where a 1-2-3-2 deployment provides the best performance for both operators, that deployment configuration may be configured because the neighboring base stations coordinate their LBT configurations via the OTA signals for accessing the shared spectrum.

Figure 6:
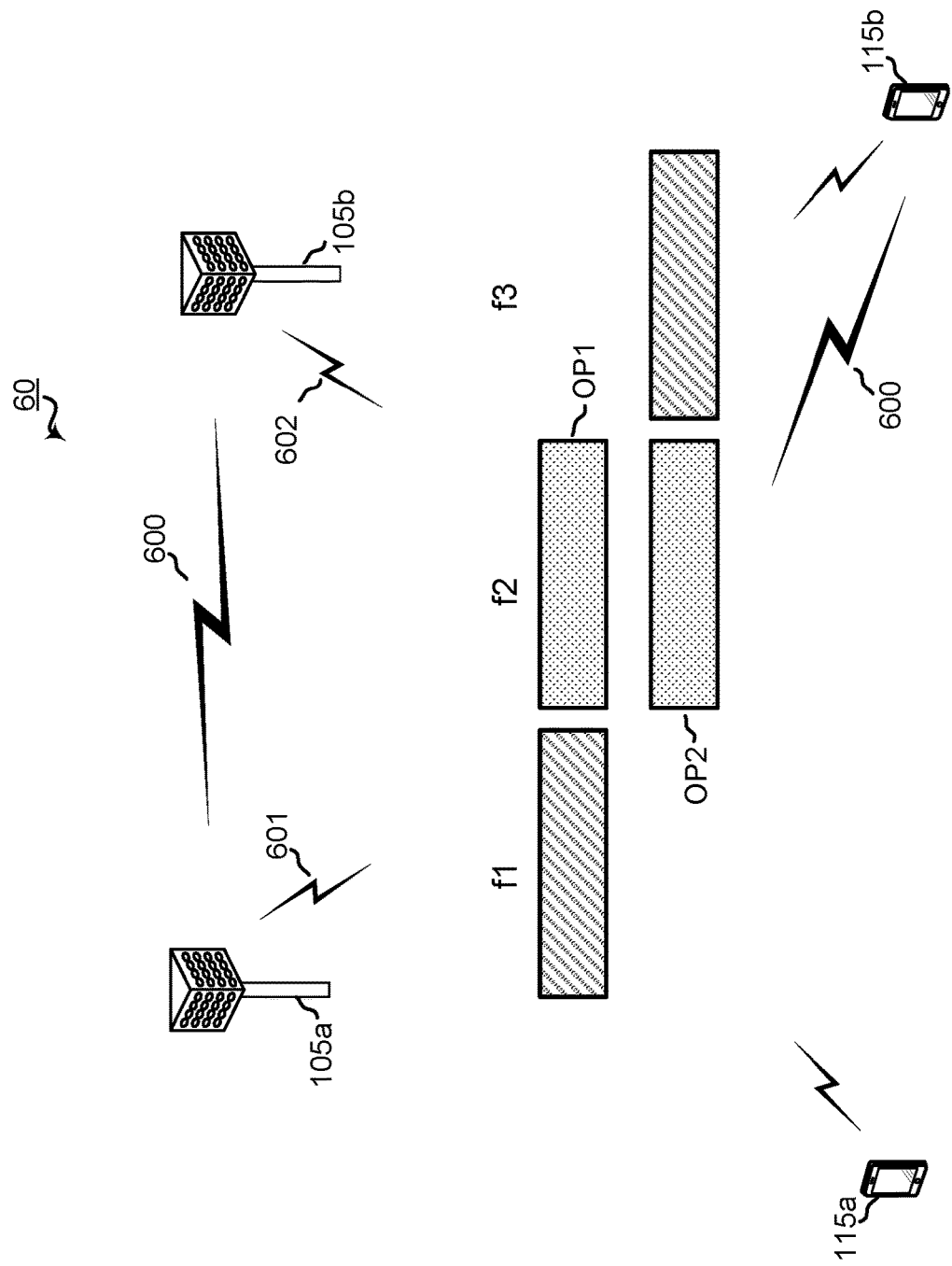
FIG. 6 is a block diagram illustrating a multi-channel network with a base station from a first operator and a base station from a second operator each configured according to one aspect of the present disclosure.

FIG. 6 is a block diagram illustrating multi-channel network 60 with a base station 105a from a first operator (Op 1) and base station 105b from a second operator (Op 2) each configured according to one aspect of the present disclosure. Multi-channel network 60 includes shared spectrum NR-U operation. When determinations at each base station, base stations 105a and 105b, for communications with their respective served UEs, UEs 115a and 115b, base stations 105a and 105b transmit LBT structure signals 600 identifying a current selected LBT structure for accessing the portion of the shared spectrum. Here, three 20 MHz channels (60 MHz BWP) are available to Op 1 and Op 2 to compete with each base station-UE pair to communicate via primary and secondary 20 MHz channel bandwidth.

In one example scenario, base station 105a transmits LBT structure signal 600 identifying its primary channel at f1 and its secondary channel at f2. Base station 105b is capable of receiving and reading LBT structure signal 600 from base station 105a and determines, when communications are scheduled with its served UE, UE 115b, to select an LBT configuration for its primary channel at f3 and its secondary channel at f2. Thus, by selecting this LBT configuration, base station 105b creates a 1-2-3-2 deployment with Op 1 and Op 2 competing for the shared spectrum at the most favorable overall deployment scheme for each operator.

In another example scenario, UE 115b autonomously intends to perform uplink transmissions with its Op 2 base station, base station 105b. UE 115b is also capable of receiving and reading LBT structure signal 600. As UE 115b prepares for autonomous uplink, it will selected an LBT structure based on signal from base station 105a and transmit its own LBT structure signal 600 informing the other neighboring nodes of the additional LBT structure. For autonomous uplink transmissions from UE 115a, UE 115a would receive LBT structure signal 600 from its own serving base station in Op 1, base station 105a, and use that signaled LBT structure to perform LBT prior to autonomous uplink transmissions.

Shared multi-channel operations may also be implemented using a hopping pattern in order to increase efficiency and access probability. Additional aspects of the present disclosure provide for each wideband capable base station (e.g., gNB, AP, etc.) to include an indication of any hopping pattern used for its LBT structure. For example, the indication within LBT structure signal 600 may simply indicate that hopping is being used or may include the hopping pattern. Additionally, LBT structure signal 600 may include an indication of the next LBT structure in the pattern or a maximum dwell time for each LBT structure in the pattern.

Figures 7A, 7B:
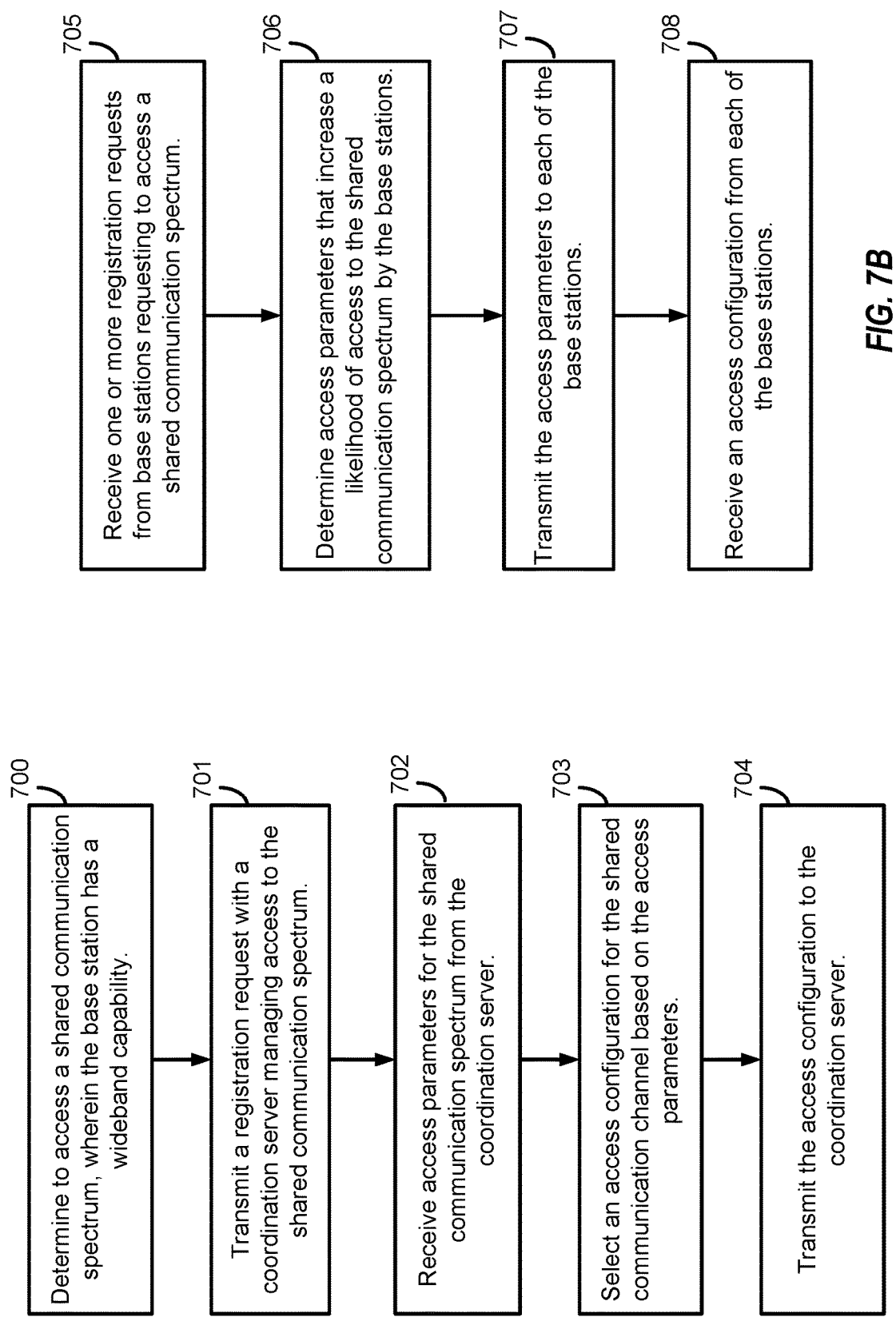
FIGS. 7A and 7B are block diagrams illustrating example blocks executed to implement aspects of the present disclosure.

FIG. 7A is a block diagram illustrating example blocks executed by a base station for implementation of one aspect of the present disclosure. The example blocks will also be described with respect to base station 105 as illustrated in FIG. 9.

At block 700, a base station determines to access a shared communication spectrum. The functionality of the described aspect arises as a base station intends to access shared communication spectrum to communicate with one or more served UEs. For example, a base station, such as base station 105 may determine it has downlink transmission for a served UE when data buffer 901, in memory 242, identifies data for transmission to the served UE. Alternatively, base station 105 may receive a scheduling request or notification of uplink communications from the served UE via antennas 234a-t and wireless radios 900a-t.

At block 701, the base station transmits a registration request with a coordination server managing access to the shared communication spectrum. Base station 105, under control of controller/processor 240, executes shared access logic 903, stored in memory 242. The execution environment of shared access logic 903 provides for base station 105 to transmit an access request signal that includes the capabilities of base station 105 and any of its served UEs. The access request signal is sent by base station 105 via wireless radios 900a-t and antennas 234a-t. Each base station, such as base station 105, registers with the inter-operator coordination server based on its capability and the RF-capabilities of its served UEs.

At block 702, the base station receives access parameters for the shared communication spectrum from the coordination server. The coordination server will respond with an allocation of the shared spectrum and the rules for LBT structuring. Base station 105 receives these access parameters via antennas 234a-t and wireless radios 900a-t and stores in memory 242 at access parameters 904.

At block 703, the base station selects an access configuration for the shared communication channel based on the access parameters. Using access parameters 904 from the coordination server, the execution environment of shared access logic 902 provides functionality for base station 105 to select both the access channels and the LBT structure intended for use when accessing the shared spectrum. Base station 105 stores the selected access channels and LBT structure at access configuration 905, in memory 242.

At block 704, the base station transmits the access configuration to the coordination server. Each base station, such as base station 105, sends the chosen spectrum and structure LBT. Base station 105 transmits the selected spectrum and LBT structure from access configuration 905 to the coordination server via wireless radios 900a-t and antennas 234a-t. The coordination server will acknowledge the access configuration and use the information of the configuration when further responding to access requests of other neighboring nodes.

Figure 10:
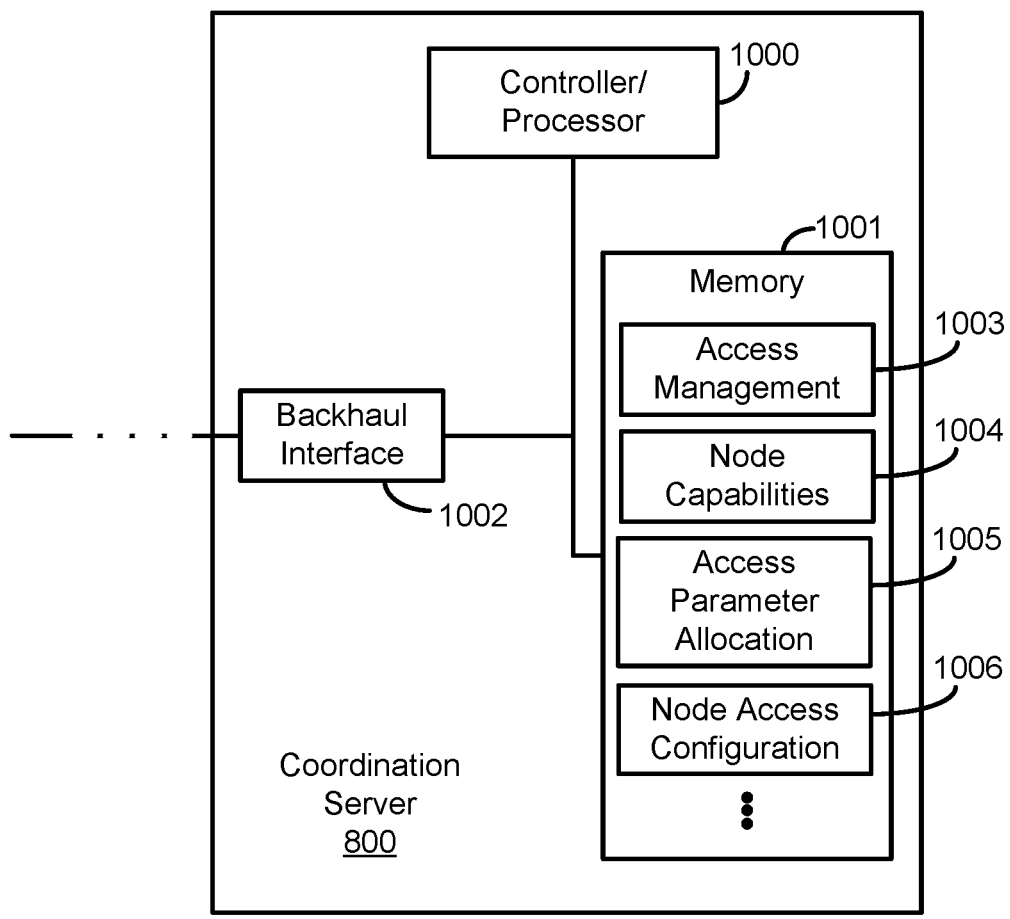
FIG. 10 is a block diagram illustrating a coordination server configured according to one aspect of the present disclosure.

FIG. 7B is a block diagram illustrating example blocks executed by a coordination server to implement one aspect of the present disclosure. The example blocks will also be described with respect to coordination server 800, as illustrated in FIG. 10. In general, coordination server 800 may include controller/processor 1000 that controls hardware components and executes code logic stored in memory 1001, the execution environment of which provides the features and functionality of coordination server 800. Coordination server 800 is further coupled to or in communication with neighboring nodes via backhaul interface 1002. Backhaul interface 1002 may provide wireline, optical, or wireless connection links for control information between other base stations.

At block 705, a coordination server receives one or more registration requests from one or more base stations requesting to access a shared communication spectrum, wherein the coordination server manages access to the shared communication spectrum. Coordination server 800 manages access to a region of shared communication spectrum. Prior to accessing this spectrum, base stations and other accessing network entities of different operators will register with coordination server 800 based on the capabilities of the accessing entities (base stations, gNB, AP, UE, station (STA), etc.). Coordination server 800 will receive the registration requests via backhaul interface 1002. Under control of controller/processor 1000, coordination server 800 executes access management logic 1003, stored in memory 1001. The execution environment of access management logic 1003 provides for coordination server 800 to identify the requests for access and extract the devices capabilities transmitted from the base stations requesting access. Coordination server 800 stores the device capabilities in memory 1001 at node capabilities 1004.

At block 706, the coordination server determines access parameters that increase a likelihood of access to the shared communication spectrum by the one or more base stations. Coordination server 800, under control of controller/processor 1000 executes access parameter allocation logic 1005, stored in memory 1001. The execution environment of access parameter allocation logic 1005 provides for coordination server 800 to determine a set of frequencies and rules for LBT structuring by the accessing nodes, based on existing information of the load and accessing of the shared spectrum. The LBT structuring rules may be determined in order to protect certain incumbent or priority users or may be selected to maximize access and throughput by complementing the LBT structures already in place by network entities that have already registered and accessed the shared spectrum.

At block 707, the coordination server transmits the access parameters to each of the one or more base stations. The execution environments of access management logic 1003 and access parameter allocation logic 105 provides for coordination server 800 to feed back the allocation of frequencies from which the accessing node may select, as well as rules for LBT structures, as the access parameters to the registering base stations or accessing nodes. The access parameters are communicated to the accessing nodes via backhaul interface 1002.

At block 708, the coordination server receives an access configuration from each of the one or more base station. Coordination server 800 receives an access configuration from each of the access nodes after the accessing nodes select channels and an LBT structure and transmits this information over backhaul interface 1002 as the access configuration. Coordinating server 800 stores the access configuration information at node access configurations 1006 in memory 1001 and acknowledges the selected configuration and uses the information for further management of the shared spectrum.

Figure 8:
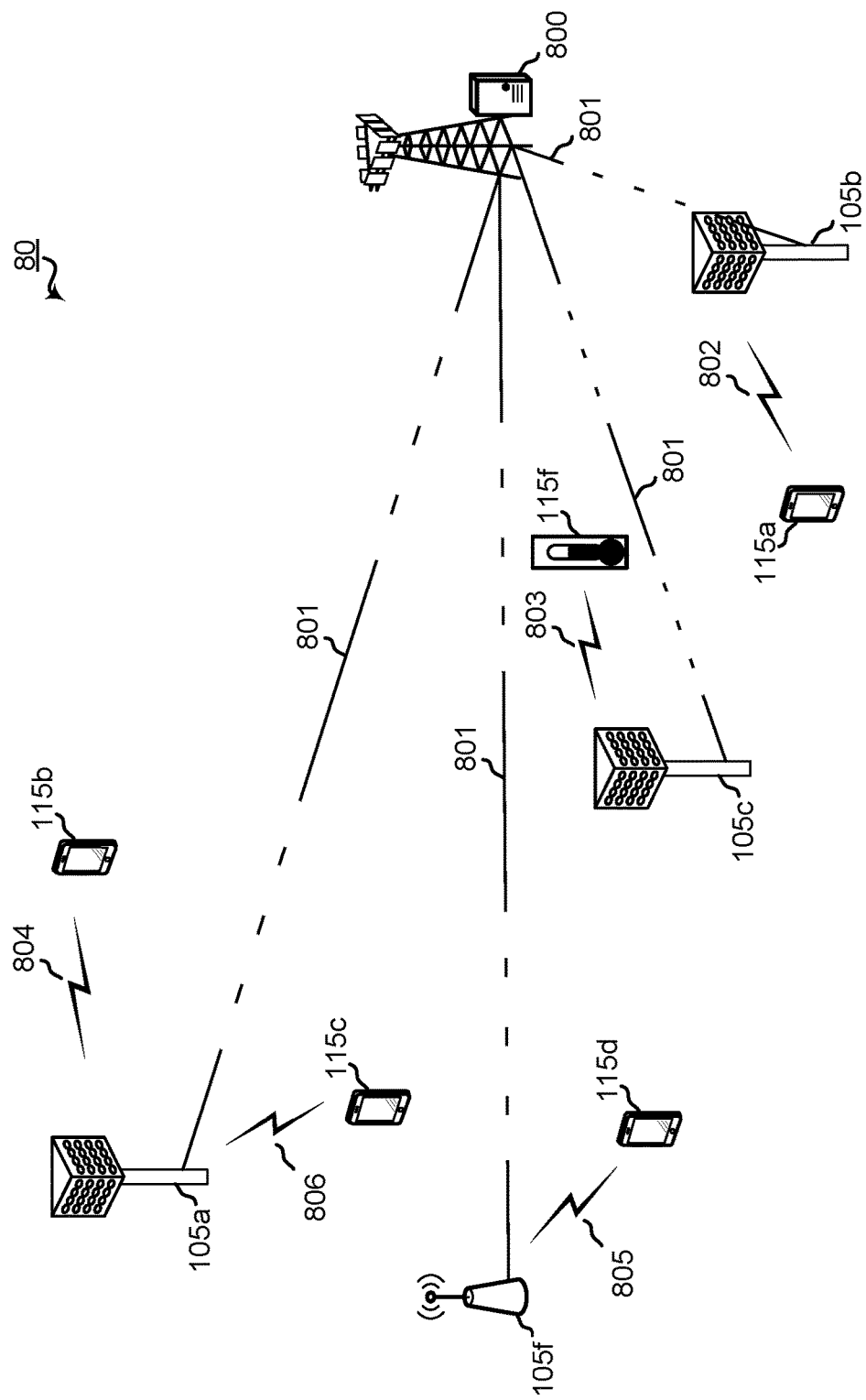
FIG. 8 is a block diagram illustrating a coordination server managing access to a multi-channel shared communication spectrum.

FIG. 8 is a block diagram illustrating a coordination server 800 managing access to a multi-channel shared communication spectrum 80. Base station 105b from operator 2 (Op 2) and base station 105c from operator 3 (Op 3) each determine to access multi-channel shared communication spectrum 80 and send access request messages to coordination server 800. The access requests may be transmitted over an inter-operator backhaul 801, which may be wireless or wireline. The access request includes information about base station 105b's and 105c's capabilities in additional to the capabilities of their respective UEs, UE 115a and UE 115f. UE 115f is a low-RF UE that is capable of single-channel communication (e.g., single 20 MHz channel). Coordination server 800 considers the access request and the capabilities information from base stations 105b and 105c and sends back access parameters to each base station, respectively, including a set of allocated frequencies and rules for LBT structuring. Because the competing access will be asymmetric between Op 2 and Op 3, the LBT structuring rules favor the interleaved primary channel configuration between Op 2 and Op 3. Base stations 105b and 105c select the particular frequencies and LBT structure (to maintain an inter-leaved primary channel) and report these access configurations, respectively, to coordination server 800. Coordination server 800 acknowledges the reported access configurations and stores the access information. Thereafter, communications 803 from Op 3 between base station 105c and UE 115f and communications 902 from Op 2 between base station 105b and UE 115a have LBT configurations and occur at the selected frequencies reflected in the access configurations transmitted from base stations 105b and 105c, respectively.

During communications, base station 105c detects that it is not able to establish communications with UE 115f at an acceptable rate due to interference from the communications of Op 2 between base station 105b and UE 115a. When the access rate falls below a predetermined minimum threshold, base station 105c sends a complaint message to coordinating server 800 via inter-operator backhaul 801. The complaint message may inform coordinating server 800 to re-evaluate the access parameters for base stations 105b and 105c. In such scenario, coordinating server 800 determines new access parameters and sends the updated parameters to base stations 105b and 105c via inter-operator backhaul 801. The updated parameters may provide spectrum allocation or different LBT structure rules that will increase the likelihood of a better access rate for communications between base station 105c and UE 115f of Op 3. For example, coordinating server 800 may provide for non-shared access by Op 3 within a certain allocated resource, while restricting the LBT structure of Op 2.

Base station 105a of operator 1 (Op 1) also desires to access multi-channel shared communication spectrum 80 and sends an access request to coordination server 800. Base station 105a has communications with UEs 115b and 115c. Coordination server 800 uses the access information from the access configurations of Op 2 and Op 3 and uses that information to send access parameters to base station 105a that accommodates the existing load of multi-channel shared communication spectrum 80. However, because of the location of base station 105a, it may not necessarily need to share channels for access with Op 2 and Op 3. Base station 105a selects frequencies and an LBT structure that favors sharing spectrum with Op 2 and Op 3. On receipt of the access configuration from base station 105a of Op 1, coordination server 800 acknowledges that configuration and accumulates an access credit in base station 105a's favor. The access credit essentially provides a measure of goodwill to the accessing network entity (base station 105a) or Op 1 for more favorable treatment at a later time in accessing multi-channel shared communication network 80. Base station 105a would then conduct communications 804 and 806 with UEs 115b and 115c, respectively, according to the access configurations selected by base station 105a.

In one example scenario base station 105f of operator 4 (Op 4) may periodically become active to serve UE 115d. Base station 105f sends the access request to coordination server 800 and obtains access to multi-channel shared communication spectrum 80 in a similar manner as previously described. However, communications between base station 105f and UE 115c may provide interference even though the access parameters selected by coordination server 800 takes into account the current loading of multi-channel shared communication spectrum 80. Base station 105f is not always active and, thus, would not always cause interference with communications of Op 1 between base station 105a and UE 115c. In detecting the increased interference at a particular time, base station 105a sends a request to coordination server 800 via inter-operator backhaul 801 for non-sharing access to part of multi-channel shared communication spectrum 80. As base station 105a has accumulated access credits at coordination server 800, when coordination server 800 receives the request from base station 105*a*, it checks the number or level of access credits associated with base station 105*a*. If the number of access credits exceeds a predefined threshold, coordination server 800 would send access parameter updates that allow base station 105*a* of Op 1 non-shared access to resources of multi-channel shared communication spectrum 80 and restrict the access of Op 4 communications from interfering with those Op 1 communications.

It should be noted that coordination server 800 can send spectrum/LBT rules update to any of base stations 105*a*-105*c* and 105*f*, which can be complaint triggered, signaled periodically, or even triggered. Coordinating server 800 may monitor various different events or have a routine configuration that causes the updating of the access parameters that may then be communicated to each access operator (Op1-Op 4).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5, 7A, and 7B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
receiving, at a coordination server, one or more registration requests from one or more base stations requesting to access a shared communication spectrum, wherein the coordination server manages access to the shared communication spectrum;
determining, by the coordination server, access parameters that increase a likelihood of access to the shared communication spectrum by the one or more base stations;
transmitting, by the coordination server, the access parameters to each of the one or more base stations; and
receiving, by the coordination server, an access configuration from each of the one or more base station.

2. The method of claim 1, wherein the one or more registration requests includes one or more of:
an indication of capabilities of the one or more base stations; and
a further indication of radio frequency (RF) capabilities of one or more user equipments (UEs) served by each of the one or more base stations.

3. The method of claim 1, wherein the access parameters include at least:
a set of rules for listen before talk (LBT) structure, and
a channel allocation of the shared communication spectrum.

4. The method of claim 1, further including:
receiving, by the coordination server, a complaint message from a base station of the one or more base stations, wherein the complaint message indicates a rate of access of the base station to the shared communication spectrum failing to meet a predetermined threshold.

5. The method of claim 4, further including:
determining, by the coordination server, updated access parameters, wherein the updated access parameters modifies the likelihood of access to the shared communication spectrum by the one or more base stations; and
transmitting, by the coordination server, the updated access parameters to at least one of the one or more base stations.

6. The method of claim 5, wherein the transmitting the updated access parameters is performed one of:
periodically;
intermittently; or
in response to the complaint message.

7. The method of claim 1, further including:
accumulating, by the coordination server, access credits for a base station of the one or more base stations whose access configuration is favorable to sharing of the shared communication spectrum by neighboring base station.

8. The method of claim 7, further including:
receiving, by the coordination server from the base station, a request for a non-shared channel of the shared communication spectrum; and
allocating, by the coordination server, the non-shared channel in response to a number of access credits exceeding an accumulation threshold.

9. A non-transitory computer-readable medium having program code recorded thereon, the program code comprising program code executable by a computer for causing the computer to:
receive, at a coordination server, one or more registration requests from one or more base stations requesting to access a shared communication spectrum, wherein the coordination server manages access to the shared communication spectrum;
determine, by the coordination server, access parameters that increase a likelihood of access to the shared communication spectrum by the one or more base stations;
transmit, by the coordination server, the access parameters to each of the one or more base stations; and
receive, by the coordination server, an access configuration from each of the one or more base station.

10. The method of claim 9, wherein the one or more registration requests includes one or more of:
an indication of capabilities of the one or more base stations; and
a further indication of radio frequency (RF) capabilities of one or more user equipments (UEs) served by each of the one or more base stations.

11. The method of claim 9, wherein the access parameters include at least:
a set of rules for listen before talk (LBT) structure, and
a channel allocation of the shared communication spectrum.

12. The method of claim 9, further including:
receiving, by the coordination server, a complaint message from a base station of the one or more base stations, wherein the complaint message indicates a rate of access of the base station to the shared communication spectrum failing to meet a predetermined threshold.

13. The method of claim 12, further including:
determining, by the coordination server, updated access parameters, wherein the updated access parameters modifies the likelihood of access to the shared communication spectrum by the one or more base stations; and
transmitting, by the coordination server, the updated access parameters to at least one of the one or more base stations.

14. The method of claim 13, wherein the transmitting the updated access parameters is performed one of:
periodically;
intermittently; or
in response to the complaint message.

15. The method of claim 9, further including:
accumulating, by the coordination server, access credits for a base station of the one or more base stations whose access configuration is favorable to sharing of the shared communication spectrum by neighboring base station.

16. The method of claim 15, further including:
receiving, by the coordination server from the base station, a request for a non-shared channel of the shared communication spectrum; and
allocating, by the coordination server, the non-shared channel in response to a number of access credits exceeding an accumulation threshold.

17. An apparatus configured for wireless communication, the apparatus comprising:
at least one processor; and
a memory coupled to the at least one processor, wherein the at least one processor is configured to:
  receive, at a coordination server, one or more registration requests from one or more base stations requesting to access a shared communication spectrum, wherein the coordination server manages access to the shared communication spectrum;
  determine, by the coordination server, access parameters that increase a likelihood of access to the shared communication spectrum by the one or more base stations;
  transmit, by the coordination server, the access parameters to each of the one or more base stations; and
  receive, by the coordination server, an access configuration from each of the one or more base station.

18. The method of claim 17, wherein the one or more registration requests includes one or more of:
  an indication of capabilities of the one or more base stations; and
  a further indication of radio frequency (RF) capabilities of one or more user equipments (UEs) served by each of the one or more base stations.

19. The method of claim 17, wherein the access parameters include at least:
  a set of rules for listen before talk (LBT) structure, and
  a channel allocation of the shared communication spectrum.

20. The method of claim 17, further including:
  receiving, by the coordination server, a complaint message from a base station of the one or more base stations, wherein the complaint message indicates a rate of access of the base station to the shared communication spectrum failing to meet a predetermined threshold.

* * * * *